United States Patent Office 3,804,858
Patented Apr. 16, 1974

3,804,858
PROCESS OF RECOVERING SPECTINOMYCIN
Heinz F. Meyer, Portage, Mich., assignor to The Upjohn Company, Kalamazoo, Mich.
No Drawing. Filed May 14, 1971, Ser. No. 143,584
Int. Cl. C07d 15/12
U.S. Cl. 260—340.3
12 Claims

ABSTRACT OF THE DISCLOSURE

A desalting process comprising adjusting an aqueous solution of spectinomycin, an antibiotic, and inorganic salts to a pH of from about 8 to about 11 and to a temperature below about 20° C., adding a solvent selected from the group consisting of acetone, isopropanol, n-propanol, and tert. butanol to the adjusted aqueous solution and precipitating the said inorganic salts.

BACKGROUND

One of the general ways for recovering spectinomycin, a valuable antibiotic, referred to as actinospectacin in some prior publications, involves the use of cation exchange resins. However, this isolation of spectinomycin has not been without difficulties. Due to the fact that spectinomycin is a weak base, sizeable quantities of inorganic ions as well as fermentation products and additional impurities generally found in a recovery procedure are eluted from the ion exchanger. Consequently, effective desalting of these solutions prior to crystallization of spectinomycin is essential for the preparation of relatively pure crystalline spectinomycin in good yields. One of the more common desalting agents employed is a solvent in which the inorganic salts are relatively insoluble and the antibiotic is relatively soluble under certain conditions. After separation of the insoluble material, the antibiotic is then crystallized out of solution by suitable methods.

The presently accepted desalting agent for spectinomycin is aqueous methanol. However, aqueous methanol can be employed successfully as a desalting solvent for the isolation of only some of the significant salts of spectinomycin. It cannot be used for the isolation of spectinomycin hydrochloride since solubility data show that methanol is an unacceptable solvent because of high mother liquor losses upon crystallization of spectinomycin hydrochloride. Although the solubility data for the isolation of spectinomycin sulfate from aqueous methanol are quite favorable, in practice, mother liquor losses far in excess of the theoretical losses, up to 30% or higher, are generally experienced in the crystallization of spectinomycin sulfate from aqueous methanol. The reason for this has not been positively ascertained but it appears that some substance present in the ion exchange eluate interferes with the expected solubility and produces what is essentially a supersaturated solution in aqueous methanol. It is a well known fact that beer components can interfere with the isolation of a fermentation product. Furthermore, there are indications that magnesium ion may play a role in maintaining a supersaturated solution of spectinomycin sulfate and particularly in the crystallization of spectinomycin from an aqueous methanol solution.

It has now been found that aqueous solutions of acetone, isopropanol, normal propanol or tert. butanol are extremely effective desalting solvents, particularly when isolating spectinomycin hydrochloride and spectinomycin sulfate. Mother liquor losses are cut to unusually low levels when crystallizing spectinomycin sulfate from these aqueous solutions. Very good results are obtained even when aqueous solutions obtained from fermentation whole beers are desalted, particularly when using aqueous acetone. Moreover, the aqueous solvents are sufficiently flexible so that spectinomycin hydrochloride can be effectively crystallized from a spectinomycin solution as well. This eliminates the necessity for converting spectinomycin sulfate crystals to spectinomycin hydrochloride crystals with the concomitant large losses of antibiotic.

SUMMARY OF THE INVENTION

In accordance with this invention, a desalting process for spectinomycin is provided comprising adjusting an aqueous solution of spectinomycin and inorganic salts to a pH of from about 8 to about 11 and to a temperature below about 20° C., adding an organic solvent selected from the group consisting of acetone, isopropanol, normal propanol and tert. butanol to the adjusted aqueous solution, and precipitating the said inorganic salts.

DETAILED DESCRIPTION OF THE INVENTION

The invention will be described in detail with regard to aqueous solutions of acetone only. However, it is to be understood that isopropanol, normal propanol or tert. butanol are also effective.

Spectinomycin, a basic compound, is elaborated by the microorganism *Streptomyces spectabilis* under controlled culture conditions. Various methods for the production of spectinomycin have been disclosed in a number of references, e.g. D. J. Mason et al., Antibiotics and Chemotherapy, 11, 118 (1961). Initial recovery procedures have also been outlined in U.S. 3,272,706. The whole beer, screened beer, filtered beer, or beer treated in some other preliminary manner is then contacted with a cation exchange resin in the hydrogen, sodium, potassium, calcium and like forms. The resin can be a solid or liquid. Examples of suitable ion exchange resins are carboxylic acid resins such as polyacrylic acid resins marketed under the trade names of Amberlite IRC–50, Duolite CS–101, or Ionac C–270. Liquid ion exchangers such as dinonylnaphthalene sulfonic acid (DNNSA) are also suitable as well.

The spectinomycin is then eluted from the ion exchanger with a nonoxidizing mineral acid. Any of the acids of this family can generally be used. However, sulfuric, phosphoric, and nitric are preferred, most preferably sulfuric acid. When using a liquid ion exchanger, the spectinomycin is extracted from the exchanger by an agent which has a higher affinity for the exchanger than the spectinomycin. An example of a suitable agent for the extraction of spectinomycin from DNNSA is aqueous t-octylamine. After extraction the aqueous solution of spectinomycin is acidified with a nonoxidizing mineral acid such as sufuric, phosphoric, nitric, preferably sulfuric acid.

The aqueous solution contains not only the acid addition salt of spectinomycin and the like but also, as aforesaid, cations such as calcium, magnesium, iron, aluminum, sodium, which are absorbed and eluted from the exchange resin along with spectinomycin. Also present in greater or lesser amount, depending upon the exact recovery procedure employed, are uncharacterized organic impurities originating in the nutrient medium or produced in the fermentation which are carried along with the spectinomycin in the recovery procedure.

Although the process of this invention can be practiced over a wide range of solids concentration, for example, 100 grams solids/liter to about 800 grams solids/liter, it is preferred to concentrate the aqueous solution, e.g. eluate, to about 500 grams solids/liter of solution or 125 grams spectinomycin free base/liter, whichever occurs first. Prior to concentration of the aqueous solution, it is preferred to adjust the pH to about 5 if it is not near this value already. Generally, the solids/activity ratio, the solids being evaluated as grams and the activity being evaluated as grams spectinomycin free base, is about 3 to 10, preferably about 5. However, aqueous solution with solids/activity ratios of from about 1.5 to about 70 can be employed with facility.

The aqueous solution is now adjusted to a pH of from about 8 to about 11 with a base such as sodium hydroxide, potassium hydroxide, sodium carbonate, ammonium hydroxide, methylamine, dimethylamine, and the like. An anion exchange resin in hydroxyl form such as the chlormethylated polystyrene product crosslinked, if desired, with divinylbenzene and then reacted with trimethylamine, dimethylamine, or dimethylethanolamine can also be employed. Sodium hydroxide is the preferred reagent. A pH below 8 generally does not provide sufficient solubility differences between the salts and spectinomycin in aqueous acetone to effect a satisfactory separation. Above a pH of about 11, advantages in crystallizing the spectinomycin are generally offset by the enhanced degradation of the spectinomycin. A pH range of about 9.5 to about 10.5 is preferred since spectinomycin free base is present in this range and better solubility differentiation between spectinomycin and the inorganic salts occurs. A pH of about 10 is even more preferred.

The actual desalting of the aqueous acetone solution is carried out at temperatures below about 20° C., preferably below about 15° C. At higher temperatures, increased solubility of the organic salts and separation of phases can be major problems which make the process less practicable.

The quantity of acetone that can be employed for desalting varies somewhat; however, from about two to about six volumes of acetone to one volume of adjusted aqueous solution, preferably from about two to about four volumes of acetone to one volume of adjusted aqueous solution, most preferably about three volumes of acetone appear to provide a good balance between cake loss and mother liquor loss of spectinomycin.

The solid material, i.e. inorganic salts, organic impurities, etc., can be separated by any suitable means such as filtration, centrifugation, and the like. If desired, the solid material can be washed with aqueous acetone to extract any spectinomycin which may have been precipitated as well and such washings can be combined with the aqueous acetone fraction. Thereafter, the aqueous acetone fraction is acidified with the acid of the spectinomycin addition salt desired, for example, with hydrochloric acid or sulfuric acid to obtain, respectively, spectinomycin hydrochloride or spectinomycin sulfate.

The term "spectinomycin sulfate," as employed in the specification and claims, refers generally to

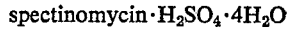

spectinomycin·H$_2$SO$_4$·4H$_2$O although other sulfate forms can also be prepared. Likewise the term "spectinomycin hydrochloride," as employed in the specification and claims refers generally to

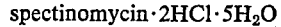

spectinomycin·2HCl·5H$_2$O although other chloride forms can also be prepared. When preparing the sulfate salt, the aqueous acetone fraction, preferably cooled to a temperature below 15° C., should be acidified with at least one equivalent of sulfuric acid to a pH of from about 0 to about 6, preferably from about 4.5 to about 5.0. Spectinomycin sulfate crystallizes from the aqueous acetone fraction after acidification and can be collected and recrystallized, if desired, from aqueous acetone. This method of isolating spectinomycin sulfate is extremely effective since the aqueous acetone desalting step can result in a mother liquor loss of about 1% or less, compared with a loss of 30% or more experienced with aqueous methanol. It should be noted that the crystallization of spectinomycin sulfate is preferably carried out at a temperature equal to or above the temperature of the desalting.

When preparing the chloride salt, the aqueous acetone fraction can be acidified with at least one equivalent of hydrochloric acid to a pH of from about 0 to about 6, preferably a pH of from about 2 to about 4 to advance crystallization of spectinomycin chloride. Prior to the acidification, it is preferred to lower the temperature of the aqueous acetone fraction to less than about 10° C., more preferably less than about 0° C., because of the higher solubility of the chloride salt in aqueous acetone and the tendency of sulfate anion to stay in solution.

Furthermore, additional acetone can be added to the acidified aqueous acetone fraction in quantities of from about 1.5 to about 8 volumes of acetone, preferably from about 2 to about 4 volumes of acetone to the acidified aqueous acetone fraction to assist in the precipitation of the spectinomycin chloride. After several hours of agitation at the lowered temperature, the spectinomycin chloride can be collected and, if desired, recrystallized from additional aqueous acetone.

Following are specific examples illustrating various embodiments of this invention. These are not intended to limit but merely to exemplify the many possible facets of the invention.

Example I.—Preparation of spectinomycin sulfate including desalting with aqueous methanol A fermentation of *Streptomyces spectabilis* is carried out under controlled culture and conditions of U.S. 3,234,092. The beer is adjusted to pH 3 with sulfuric acid, freed from calcium ion with sodium fluoride, filtered, readjusted to pH 8 and sorbed on a column of Amberlite IRC–50, also adjusted to pH 8. The column is then eluted with water adjusted to pH 1.8 with sulfuric acid. One liter of the eluate is adjusted with sodium hydroxide to pH 5 and concentrated to 500 g. solids/liter. It has a solids/activity ratio of 13. The aqueous concentrate is adjusted to pH 10 with 50% aqueous sodium hydroxide and cooled to a temperature of 14° C. Four volumes of methanol are added to the adjusted aqueous solution and the temperature maintained at 14° C. Inorganic salts and various impurities are precipitated out. The precipitate is separated from the aqueous methanol fraction by filtration. The cake loss is 17% based on spectinomycin assay of the eluate. The aqueous methanol fraction is acidified with 18 N sulfuric acid to pH 5.0 and spectinomycin sulfate crystallizes out of solution. The precipitate is collected and washed three times with 80% aqueous methanol. The yield of spectinomycin sulfate is 46% based on eluate assay.

Example II.—Preparation of spectinomycin sulfate with aqueous acetone desalting

A fermentation of *Streptomyces spectabilis* is carried out under controlled culture and conditions of U.S. 3,234,-092. The beer is adjusted to pH 3 with sulfuric acid, freed from calcium ion with sodium fluoride, filtered, readjusted to pH 8 and sorbed on a column of Amberlite IRC–50 adjusted also to pH 8. The column is then eluted with water adjusted to pH 1.8 with sulfuric acid. One liter of the eluate is adjusted to pH 5 and concentrated to 500 g. solids/liter. It has a solids/activity ratio of 5.4 gram solids/gram spectinomycin free base. It is then adjusted to a pH of 10.0 with 50% aqueous sodium hydroxide and cooled to a temperature of 14° C. Three volumes of acetone, 420 ml., are added to the adjusted aqueous solution and the temperature is maintained at 14° C. and inorganic salts and various impurities precipitate out. The precipitate is separated from the aqueous acetone fraction by filtration. The cake is washed with 200 ml. 75% aqueous acetone. The cake loss is 3% based on activity of the eluate.

The aqueous acetone fraction is acidified with 18 N sulfuric acid to a pH of 5.0 and spectinomycin sulfate crystallizes. The precipitate is washed with about 10 ml. of 75% aqueous acetone, then with about 40 ml. of acetone. The yield of spectinomycin sulfate is 96% based on the spectinomycin assayed in the eluate.

Example III.—Preparation of spectinomycin hydrochloride with aqueous acetone desalting A fermentation of *Streptomyces spectabilis* is carried out under controlled culture and conditions of U.S. 3,234,092. The beer is adjusted to pH 3 with sulfuric acid and filtered. The filtered beer is adjusted to pH 6 and spectinomycin extracted into ⅓ beer volume of methylene chloride containing 2% Na-SUL-SS (a 50% solution of sodium dinonylnaphthalene sulfonate in coastal oil. DNNS is described in U.S. Pat. 2,764,548 and is employed as a liquid ion exchanger in U.S. Pat. 3,318,867. It is obtained from the R. T. Vanderbilt Co., Inc., New York, N.Y., in a solution of coastal oil, which is a mineral oil). The extract is concentrated to 1/20 of its volume. The concentrate is extracted with about ½ volume of water containing 0.135 kg. t-octylamine/kg. Na-SUL-SS and adjusted to pH 4.3 with sulfuric acid. The aqueous extract is concentrated to 125 g. base/l. and has a solids/activity ratio of 2.8. One liter of this concentrate is adjusted to pH 10 with 50% aqueous sodium hydroxide and cooled to a temperature of 12° C. Three volumes of acetone, 3 liters, are added to the adjusted aqueous solution while maintaining the temperature at 12° C. and inorganic salts and various impurities are precipitated out. The precipitate is separated from the aqueous acetone fraction by filtration. The cake loss is 2% based on the spectinomycin assayed in cake, crystals, and mother liquor. The aqueous acetone fraction is maintained at 12° C. and acidified to pH 2 with 6 N hydrochloric acid. After crystals of spectinomycin hydrochloride begin precipitating, two more volumes of acetone, 2 liters, are added to the acidified aqueous acetone fraction to complete the crystallization. After storing overnight at −10° C., the spectinomycin hydrochloride is collected and washed three times with acetone. The yield of spectinomycin hydrochloride is 89%, based on the spectinomycin assayed in cake, crystals, and mother liquor.

Example IV.—Preparation of spectinomycin sulfate with aqueous n-propanol desalting A fermentation of *Streptomyces spectabilis* is carried out under controlled culture and conditions of U.S. 3,234,092. The beer is adjusted to pH 3 with sulfuric acid, and filtered. The filtered beer is adjusted to pH 6 and spectinomycin extracted into ⅓ beer volume of methylene chloride containing 2% Na-SUL-SS (a 50% solution of sodium dinonylnaphthalene sulfonate in coastal oil). The extract is concentrated to 1/20 volume of its volume. The concentrate is extracted with about ½ volume of water containing 0.135 kg. t-octylamine/kg. Na-SUL-SS and adjusted to pH 4.3 with sulfuric acid. The aqueous extract is concentrated to 100 g. base/liter and has a solids/activity ratio of 3.1. 100 ml. of this concentrate is adjusted to pH 10 with 50% aqueous sodium hydroxide and cooled to 12° C.

Four volumes of n-propanol (400 ml.) are added to the adjusted aqueous solution while maintaining the temperature at 12° C. and inorganic salts and various impurities are precipitated out. The precipitate is separated from the aqueous n-propanol fraction by filtration. The cake loss is 1.4% based on the spectinomycin assayed in the concentrated aqueous solution before desalting. The aqueous n-propanol fraction is maintained at 12° C. and acidified to pH 5 with 18 N sulfuric acid. Spectinomycin sulfate crystallizes. Four more volumes of n-propanol (400 ml.) are added. After 3 hours at 0° C. the crystals are filtered and washed with two displacement volumes of n-propanol. The yield of spectinomycin sulfate is 85% based on the spectinomycin assayed in the concentrated aqueous solution before desalting.

Example V.—Preparation of spectinomycin hydrochloride including desalting with aqueous i-propanol An aqueous concentrate is prepared as in Example IV and adjusted to 12° C. and pH 10.

Then four volumes of i-propanol (400 ml.) are added while maintaining the temperature at 12° C. Inorganic salts and other impurities are precipitated from the aqueous i-propanol by filtration. The cake loss is 10.3% based on the spectinomycin assayed in the concentrated aqueous solution before desalting. The aqueous i-propanol fraction is maintained at 12° C. and acidified to pH 2 with 6 N hydrochloric acid. Spectinomycin hydrochloride crystallizes. Four more volumes of i-propanol are added. The crystals are filtered after agitation for 3 hours at 0° C. and washed with two displacement volumes of i-propanol. The yield of spectinomycin chloride is 74% based on the spectinomycin assayed in the concentrated aqueous solution before desalting.

I claim:

1. A desalting process which comprises the steps of contacting a spectinomycin containing fermentation beer with an ion exchanger, eluting from the ion exchanger an aqueous solution comprising spectinomycin, metal salts and organic impurities, said solution having a solids/activity ratio of from about 3 to about 70, adjusting the aqueous solution to a pH of from about 9.5 to about 11 and to a temperature below 20° C., adding a solvent selected from the group consisting of acetone, isopropanol, n-propanol and tert. butanol to the adjusted aqueous solution and precipitating the said metal salts.

2. A process in accordance with claim 1 wherein the solution of spectinomycin is spectinomycin sulfate.

3. A process in accordance with claim 2 wherein the aqueous solution is cooled to less than 15° C. and the solvent is acetone.

4. A process in accordance with claim 3 wherein the aqueous solution is adjusted to pH of from about 9.5 to 10.5.

5. A process in accordance with claim 4 wherein the aqueous solution has a solid concentration of from 100 grams solids/liter to about 800 grams solids/liter.

6. A process in accordance with claim 5 wherein the solids concentration is about 500 grams solids/liter and the solids/activity ratio is about 3 to about 10.

7. A process in accordance with claim 4 wherein the quantity of acetone added to the adjusted aqueous solution is from about two to about six volumes of acetone to one volume of adjusted aqueous solution.

8. A process in accordance with claim 4 wherein the aqueous solution of spectinomycin is recovered from fermentation whole beer.

9. A process in accordance with claim 7 wherein the aqueous acetone fraction is acidified with sulfuric acid and spectinomycin sulfate crystallizes.

10. A process in accordance with claim 7 wherein the aqueous acetone fraction is acidified with hydrochloric acid and spectinomycin chloride crystallizes.

11. A process in accordance with claim 10 wherein the aqueous acetone fraction is maintained at a temperature below about 10° C. and the aqueous acetone fraction is acidified to a pH of from about 0 to about 5.

12. A desalting process which comprises the steps of contacting a spectinomycin containing fermentation beer with an ion exchanger, eluting with an acid selected from the group consisting of sulfuric, nitric and hydrochloric from the ion exchanger an aqueous solution comprising spectinomycin, metal salts and organic impurities, said solution having a solids/activity ratio of about 3 to about 70 and a solids concentration of from about 100 to about 800 grams solids/liter, adjusting the aqueous solution to a pH of from about 9.5 to about 10.5 and to a temperature below 15° C., adding a solvent selected from the group consisting of n-propanol and isopropanol, and tertiary butanol to the adjusted aqueous solution in quantities from about two to about six volumes of solvent to one volume of adjusted aqueous solution and precipitating the said metal salts.

References Cited

UNITED STATES PATENTS 3,269,907  8/1966  Jahnke _____ 260—340.3
3,279,989  10/1966 Jahnke _____ 260—340.3

DONALD G. DAUS, Primary Examiner

J. H. TURNIPSEED, Assistant Examiner

U.S. Cl. X.R.

424—278